United States Patent Office 3,459,500
Patented Aug. 5, 1969

3,459,500
NOVEL LITHIUM SILICATE COMPOSITIONS AND PROCESS FOR PRODUCING SAME
Marnell Albin Segura, Baton Rouge, La., and Edward Allen Hunter, Lake Jackson, Tex., assignors to Esso Research and Engineering Company, a corporation of Delaware
No Drawing. Filed Nov. 27, 1964, Ser. No. 414,408
Int. Cl. C01b *33/32*
U.S. Cl. 23—110                12 Claims

ABSTRACT OF THE DISCLOSURE

This invention relates to an improved process for the preparation of water soluble lithium silicate compositions. The water-soluble lithium silicate is prepared by exchanging lithium salts over a strongly acidic ion exchange resin and subsequently employing a sodium silicate solution in a second exchange to produce the lithium silicate solution.

---

This invention relates to novel lithium silicate compositions and to the preparation of same; more particularly it relates to an improved process for the preparation of a composition comprising a water soluble lithium silicate alone or in mixture with sodium silicate.

Soluble silicates, once widely referred to as "waterglass," have been well known tto the art as being alkali metal silicates other than lithium. In this regard, the literature, e.g. "Handbook of Chemistry," Lange, 10th Edition, teaches that lithium silicate is essentially insoluble in water and it is generally known that stable solutions cannot be prepared. In view of the physical limitations of lithium silicate, sodium silicate is the alkali silicate which finds essentially exclusive use in industry for such applications as: adhesives for paper boxes and wood veneer, mild alkalis in soaps, emulsifying agents, protective coatings, as well as for many other miscellaneous applications. The sodium silicate liquids generally are made by melting quartz with soda ash of high purity. Solutions of up to 1 mole of $Na_2O$ to 3.5 moles of $SiO_2$ may be formed by dissolving the fused anhydrous sodium silicate solids in water. High ratios of silicon dioxide to sodium oxide requires removal of part of the alkali metal by electrolysis. Sodium silicate solutions from 1.5 $SiO_2$ to 3.5 $SiO_2$ per mole of $Na_2O$ are commercially available.

An additional advantageous utility for sodium silicate compositions, for example, silicates of a molar ratio of 1 $Na_2O$ to 3.22 $SiO_2$, is the use thereof in the preparation of zinc-silicate coatings which are employed as protective coatings for storage vessels, tankers, other marine facilities, and the like. It has been found, however, that sodium silicate requires the introduction of a proton to cause the polymerization of the silicate portion therein into a long chain $SiO_2$ polymer. Such introduction of a proton is achieved by the application of a coat of an acidic curing solution over the initial sodium silicate coat. That this "two coat" system is disadvantageous, is evident both from material costs incurred as well as from the labor required to produce a finished film of satisfactory coating. It is manifest, therefore, that a single application self-curing zinc coating would be highly desirable in order to overcome the disadvantages of the state of the art.

Accordingly, it is an object of this invention to provide a process for preparing a water-soluble lithium silicate composition alone or in mixture with sodium silicate and, furthermore, prepare such silicate composition which would find utility in an essentially new type of silicate compound.

The preparation of a water-soluble lithium silicate is especially noteworthy since, as mentioned, the technical literature refers to the silicates of lithium as being insoluble and is, furthermore, strikingly void of any data pertaining to the preparation of solutions of these lithium silicates. In this regard, only minor references are presently found which state that only extremely small amounts of silica can be dissolved in cold lithium hydroxide and that the resulting solutions are very unstable.

Another characteristic surprisingly advantageous to lithium silicate is that, upon drying by water evaporation, such silicate produces a film which is extremely insoluble in water. On the other hand, however, sodium silicate upon comparable drying by water evaporation, forms a film which is quite sensitive to water. This latter result is attributable to the fact that the silica has not polymerized into the weakly bonded silicon dioxide polymer. As hereinbefore stated, salts or acids may be used to make the sodium silicate film insoluble. The ability of lithium silicate to form a water insoluble film is a physical property of the compound which is believed resultant from the size of $Li_2O$ molecule which is extremely small in comparison with the $SiO_2$ molecule. Thus, in sodium silicate solutions, the $Na_2O$ molecule is very large in comparison with the $SiO_2$ molecules and the physical touching or bonding of the silicon dioxide cannot feasibly occur. Upon the addition of an acid or salt, however, the sodium oxide is removed from the solution and the silicon dioxide can, consequently, polymerize into a water insoluble mass. As heretofore mentioned, with lithium silicate this comparison of molecular size is just the converse. Since the size of the $Li_2O$ molecule is very small in comparison with the $SiO_2$, the silicon dioxide can actually touch, but polymerization is prevented by the presence of water. Hence, upon evaporation of the water present in the solution, the silicon dioxide polymerizes rapidly into an insoluble mass.

Further comparison of other physical properties of lithium silicate, except for essentially complete water insolubility, evidences properties which are very similar to the alkali metal silicate class. Thus, precipitation of silica gel by the addition of acids can be made; it has excellent flotation properties, it reduces the surface tension of water when added thereto; and forms an excellent adhesive film for paper.

Broadly, in order to accomplish the above objects and advantages, the present invention comprises a process wherein an ion exchange resin, containing but preferably saturated with lithium ions is contacted with sodium silicate. Advantageously, the resultant lithium silicate is substantially soluble and is characterized as a clear solution. It has been found that by proper feed rate of sodium silicate, selective mixtures of sodium and lithium silicate can be obtained.

In a preferred embodiment of this invention, lithium silicate solutions can be prepared by exchanging lithium sulfate over a strongly acidic ion exchange resin to yield an ion exchange resin substantially saturated with lithium ions, and $H_2SO_4$. This initial exchange is followed by a second exchange employing sodium silicate solution to yield an ion exchange resin substantially saturated with sodium ions, and the desired lithium silicate solution. Advantageously, the thus formed sulfuric acid ccan be used to regenerate the sodium ion-charged ion exchange resin.

In addition to accomplishing the aforementioned objects, the process of the present invention further finds expediency in the following additional advantages:

(1) Inexpensive equipment, operating at atmospheric pressure and ambient temperatures, may be employed.

(2) The ability to utilize relatively inexpensive raw materials, i.e., sodium silicate vs. silica gel.

(3) Complete flexibility in varying the sodium-lithium-silicon dioxide ratio.

(4) Adaptability to easy, but yet precise, process control.

(5) Essentially indefinite effective use of the ion exchange resin employed.

The resinous materials suitable for use as the ion exchange medium in the process of the present invention can be generally defined as an aryl type resin. They include the common thermosetting resin such as the solid sulfonated or sulfited condensation products of formaldehyde with phenol; natural resins such as coal, wood or waste petroleum sludge; as well as suitably cross-linked solid polymers of vinyl aromatic compounds such as styrene or vinyl toluene, or cross-linked copolymers of the vinyl aromatic compounds with other monoethylenically unsaturated compounds such as acrylonitrile or its homologs, acrylamide or its homologs, and methylacrylate or methacrylate or its higher alkyl homologs. For the purposes of this invention, these resinous materials must further contain strong mineral acid groups attached to the organic skeleton thereof, a portion of these acid groups preferably being in the free acid form. For the present purposes, the ion exchange materials preferably have a molecular weight high enough or a sufficiently cross-linked structure to be substantially insoluble in water at temperatures up to about 250° F. They should also have good oxidation resistance, good stability towards heat and physical stress and good exchange capacity, as well as exchange rate.

These resins utilized herein may be prepared in a variety of ways and from a variety of raw materials. For instance, a sulfonation or an equivalent acid treatment may be applied either to a monomer such as styrene which is subsequently polymerized into a stable high molecular weight ion exchange resin; or, preferably, the organic resin may be formed first and the acid groups introduced by treating the solid resin in suitably subdivided or granulated form.

Examples of resins particularly suitable for purposes of the present invention include solid cross-linked polymers of vinyl aromatic compounds, such as styrene or vinyl toluene; or cross-linked copolymers of the vinyl aromatic compounds with other monoethylenically unsaturated compounds such as isobutylene, acrylonitrile or its homologs, acrylamide or its homologs, and methylacrylate or methacrylate or their higher alkyl homologs. The required degree of cross-linking can be obtained either during the synthesis of the resin or by treatment after the synthesis. For instance, in the case of polystyrene type resins a minor amount in the range of from about 4 to 25% of a hydrocarbon containing two non-conjugated ethylenic linkages such as divinyl benzene can be added to the styrene monomer in the polymerization mixture so as to produce a resin with a three-dimensional latice structure. Subsequently, this interpolymerized divinyl benzene forms a cross-link between adjacent polystyrene chains. Alternatively, a minor amount of a conjugated diolefin such as butadiene or isoprene can be added to the polymerization mixture to produce a thermoplastic resin which can be subsequently cross-linked by vulcanization with sulfur or the like. Still other cross-linking agents for linear or slightly cross-linked polymers, such as polystyrene resins containing two to four percent divinyl benzene include: treatment with carbon tetrachloride at 280–400° F.; exposure at atmospheric temperature to gamma rays in a gamma ray source such as a cobalt 60 source at dosages of about 5 to 10 or 25 million roentgen units, etc.

The best ion exchange resins for purposes of the present invention can be prepared from resinous copolymers of styrene containing a minor amount of p-divinyl benzene combined therewith, with resins containing about 88 to 96% styrene copolymerized with 12 to 4% of divinyl benzene being particularly satisfactory in both exchange capacity and rate as well as stability.

It will be understood, of course, that the described polystyrene type ion-exchange resins as well as their preparation are well known and readily available as commercial products. For instance, a particularly good exchange medium for the purposes of the present invention is a commercial cation exchange resin known under the trade-name Dowex 500-W and made by the Dow Chemical Company. Another is Dowex 50-X8 also made by the Dow Chemical Company and which comprises a sulfonated resinous copolymer of about 92% styrene and 8% divinyl benzene, which contains about 44 to 50% moisture and about 12–16% sulfur in a sulfonate form, based on anhydrous resin. This material has approximately the same acidity as benzene sulfonic acid. Useful materials of this type having a somewhat higher divinyl benzene content are also marketed under the names of Dowex 50X12 as well as Dowex 50X16. Another particularly outstanding material is Dowex 50WX8 which is prepared by introducing the sulfonic acid groups into the polymer under special conditions so that oxidation of the polymer is almost completely avoided.

Other satisfactory sulfonated polystyrene ion exchange resins are sold by the Rohm & Haas Company under the "Amberlite" trademark, particularly "Amberlite IR–120." All of these sulfonic acid type ion-exchange resins are usually sold in the form of sodium salts which can be readily converted or generated to the acid type by washing with an aqueous solution of sulfuric or hydrochloric acid in a manner well known by itself. In such generation, the hydrogen ions of the wash acid replace the sodium ions of the initial resin. The ion-exchange resins in their free acid form have an acidity of about 2 to 10 milliequivalents per gram, depending upon the resin base and extent of sulfonation. The preferred commercial polystyrene-type sulfonated resins usually have an acidity of about 5 milliequivalents per gram.

In accordance with the invention, the hydrogen ion exchange resins just described are initially modified by replacing essentially all of their hydrogen ions with metal, i.e. lithium, ions. This can be accomplished by impregnating the resins with a proper amount of an aqueous or acidic solution of a lithium salt, and washing off the resulting free acid produced by the exchange of the lithium metal ions for the hydrogen ions of the resin. In most instances, aqueous solutions of salts of the lithium metal ion can be used in the impregnation. Non-limiting examples of such lithium salts include lithium acetate, lithium aluminate, lithium amide, lithium antiminide, lithium oxonate, lithium tetraborate, lithium carbonate, lithium chlorate, lithium fluorosulfonate, lithium iodide, lithium nitrate, lithium oxalate, lithium perchlorate, lithium sulfide, lithium urate, and the like. The anion of the metal salts is of course chosen with a view of assuring ready solubility in water. However, if the salt in question is not readily soluble in water, e.g., lithium carbonate, free acids such as hydrochloric acid may be added to aid in the dissolving process. Also, it may sometimes be desirable to impregnate the ion exchange resin with salts or metal organic compounds contained in solvents of lower polarities such as alcohol, ether, or hydrocarbons.

In accordance with the invention, a typical first step of the process utilizing ion exchange for the separation of metallic ions is one in which lithium ions are separated by the use of the above mentioned cationic type of ion exchange resins. If desired, one, two and frequently more beds, preferably columnar beds of the ion exchange resin are used in such a process. An aqueous solution containing metallic ions of lithium is fed to the columnar bed of the ion exchange resin which is already loaded with adsorbed hydrogen ions and in which the lithium ions displace the hydrogen ions from the ion exchange resin. The introduction of the aqueous solution of the lithium ions to the column is continued until the resin is loaded to its capacity with adsorbed lithium ions.

After the passing of the aqueous solution of the lithium salt through the ion exchange resin has been stopped, said resin is preferably washed with plain water in order to wash therefrom the lithium salt adhering thereto. Generally, about 1 to 5 volumes of water are employed per volume of ion exchange resin to effectively wash the undesirable components adhering to the resin.

After the passing of the lithium salt solution through the resin and said resin has been washed, an aqueous solution of sodium silicate is then fed through the ion exchange resin. The sodium silicate solution, in effect, serves as an eluting agent and displaces the lithium ions from the ion exchange resins leaving that resin loaded with adsorbed sodium ions. The effluent resulting from the second pass, i.e. the lithium silicate solution, is collected in a suitable effluent tank or reservoir and, accordingly, the process is continued until towards the end of the operation the effluent from the ion exchange bed begins to show the presence of Na ions. This point may be calculated from the capacity of the resin or determined by any convenient test such as the well known flame test. The process is then stopped and the collected effluent is either utilized as such or further concentrated, as by evaporation. Thereafter the ion exchange resin is regenerated, for example, with the $H_2SO_4$ solution resulting from the first pass, to be made ready for further use.

In accordance with the invention, the reaction conditions utilized, e.g. temperatures, pressures, reaction or contact times, and the like are determined by the final composition desired for lithium silicate or sodium-lithium silicate product. Generally, however, the lithium salt employed as the starting reactant for the first pass will comprise an aqueous solution containing from about 2 to about 30% of the lithium salt dissolved therein. Similarly, the sodium silicate solution employed generally comprises an aqueous solution containing from about 2 to about 30 wt. percent, based on said solution, of sodium silicate dissolved therein. It should be realized, of course, that the content of both of the foregoing solutions can be varied over wide limits but it has been found that the above defined limits are most efficacious to the process of this invention.

The reaction temperatures utilized in the process herein may also vary over wide limits but, generally, will range from about 5 to about 40° C. The pressure employed is dictated solely by requirement of maintenance of reactants in the liquid phase. Inasmuch as atmospheric pressure suitably maintains the water in a liquid phase, such pressure is found suitably operable herein. The reaction or contact times may also cover a broad range of reaction or contact periods and is limited predominantly by the range of $Na_2O/Li_2O$ ratio resulting in the final product. Generally, the reaction or contact times are adjusted so that a ratio of $Na_2O/Li_2O$ ratio will not exceed 1:1. A suitable range of reaction or contact times may be defined by rates of from about 1 to 5 volumes of solution pass per 100 volumes of resin per minute the reaction or contact is effected.

As mentioned, it is found advantageous to evaporate the effluent, preferably in a vacuum evaporator to a fraction, e.g. about ⅓ (15%) to ⅙ (30%), of its original bulk, which therefore raises its silica content to about 11.5 to 25%. By utilization of the process of the present invention, the silica solution prepared may have a ratio of $SiO_2$ to $Na_2O$ from about 4.5:0 up to about 3.25:0.5. While under certain circumstances it may be desirable to remove as much of the alkali as possible, a very small amount of it allowed to remain in the product is found to be advantageous as it greatly enhances good keeping qualities of product solution.

After the passing of the sodium silicate solution through the ion exchange resin has been stopped, the resin may, if desired, be regenerated as follows: It is first backwashed with plain water to wash therefrom the sodium silicate adhering thereto and is then treated with a dilute solution of sulfuric acid, preferably using the acid produced as the effluent from the first step, where after the acid is removed and the ion exchange resin washed with water to remove the excess acid and sodium sulfate which has been formed as a result of the action of the acid upon the resin. After the acid has been thus washed out, the resin is ready to be used for the production of a further batch of lithium silicate solution according to the present invention. The sulfuric acid is preferably used in a concentration of about 4% of actual $H_2SO_4$.

In order that the invention may be better understood, the following specific illustrative examples are given in addition to those generally described above:

Example 1

This example serves to illustrate that by proper selection of the lithium salt utilized, e.g. lithium sulfate herein, aqueous lithium silicate solutions, are produced by ion exchange and in addition an acid is also produced as the effluent from the first step; which acid can be used as a regenerant for said ion exchange resin.

Accordingly, 400 cc. of Dowex 500W strongly acidic cation exchange resin was added to a glass column, 6.0 cm. in dia. In order to insure complete acidification of the resin, a solution of 10% HCl in the amount of 550 grams was passed through the resin at a rate of about 15 ml./min. Following this acidification, the resin was washed with distilled water until an effluent from the column was neutral as tested by hydrion paper.

Subsequent to the washing step, 800 grams of a 10% solution of lithium sulfate was passed through the acidified wash resin at a rate of 15 ml./minute. The effluent from the column was found to be strongly acidic thus showing that the lithium had remained on the resin by exchanging with the H+ which replaced it in solution.

Following the exchange with lithium sulfate solution, the resin was again washed with distilled water until a neutral effluent was obtained. A 5% solution of sodium silicate having a $Na_2O$ to $SiO_2$ ratio of 1:3.25 was then passed through the resin bed at a rate of 15 ml./min. up to 486 grams had been used. The effluent from the column was tested and found to contain lithium metal ion but no sodium metal ion. The final ratio of $Li_2O$ to $SiO_2$ was 1:3.25.

In order to determine utility of the resulting lithium sulfate solution, a thin film was drawn on a metal plate using said solution. The film cured at atmospheric conditions overnight and resulted in a clear hard surface.

While the invention has been described with reference to various examples and embodiments, it will be apparent to those skilled in the art that various modifications may be made without departing from the principles and the true nature of the invention which is intended to be limited only by the scope of the appended claims.

What is claimed is:

1. A process for the preparation of a substantially water-soluble lithium silicate composition which comprises contacting a lithium ion-impregnated exchange resin with a sodium silicate solution and recovering a substantially water-soluble lithium silicate composition.

2. The process of claim 1 in which said ion exchange resin is a solid cross-linked polymer of a vinyl aromatic compound.

3. The process of claim 1 in which about 1 to 5 volumes of sodium silicate solution pass per minute per hundred volumes of ion exchange resin utilized.

4. A process for the preparation of a substantially water-soluble lithium silicate composition which comprises contacting a resinous material containing strong mineral acid groups attached to the organic skeleton thereof with an aqueous solution of a lithium salt and subsequently contacting the lithium ion-impregnated resinous material with an aqueous solution of sodium silicate and recovering a substantially water-soluble lithium silicate composition.

5. The process of claim 4 in which said ion exchange resin is a resinous copolymer of styrene containing a minor amount of p-divinyl benzene combined therewith.

6. The process of claim 4 in which about 1 to 5 volumes of aqueous sodium silicate solution pass per minute per hundred volumes of ion exchange resin utilized.

7. A process for the preparation of a substantially water-soluble lithium silicate composition which comprises contacting a resinous material containing strong mineral acid groups attached to the organic skeleton thereof with an aqueous solution of lithium sulfate, washing said resinous material with water, and subsequently contacting the lithium ion-impregnated resinous material with an aqueous solution of sodium silicate and recovering a substantially water-soluble lithium silicate composition.

8. The process of claim 7 in which the wash water is used to regenerate the resinous material after contact with said aqueous solution of sodium silicate.

9. A process for the preparation of a substantially water-soluble lithium silicate composition which comprises contacting a resinous material containing strong mineral acid groups attached to the organic skeleton thereof with from 1 to 5 volumes per minute per one hundred volumes of said resinous material of an aqueous solution of lithium sulfate, washing said resinous material with water, collecting said wash water, subsequently contacting the lithium ion-impregnated resinous material with an aqueous solution of sodium silicate, and recovering a substantially water-soluble lithium silicate composition and regenerating the resinous material with the collected aqueous sulfuric acid.

10. The process of claim 7 in which said process is effected in the liquid phase at a temperature in the range of from about 5° to 40° C.

11. The process of claim 7 in which the lithium sulfate solution contains about 5 to 25% of lithium sulfate salt dissolved therein.

12. The process of claim 7 in which the sodium silicate solution contains about 5 to 30% of sodium silicate salt dissolved therein.

References Cited

UNITED STATES PATENTS

| | | | |
|---|---|---|---|
| 2,858,277 | 10/1958 | Hunter | 252—313 |
| 2,980,498 | 4/1961 | Wheaton et al. | 23—32 |
| 3,295,920 | 1/1967 | Goodenough et al. | 23—50 |

OTHER REFERENCES

Kracek: Jour. Amer. Chem. Soc., vol. 61, pp. 2157–2161.

OSCAR R. VERTIZ, Primary Examiner

A. GREIF, Assistant Examiner

U.S. Cl. X.R.

252—313